(12) United States Patent
Herwitz

(10) Patent No.: US 7,706,979 B1
(45) Date of Patent: Apr. 27, 2010

(54) CLOSEST POINTS OF APPROACH DETERMINATION FOR UNMANNED AERIAL VEHICLE GROUND-BASED SENSE-AND-AVOID DISPLAY SYSTEM

(76) Inventor: Stanley Robert Herwitz, 59 Puritan Rd., Newton, MA (US) 02461

( * ) Notice: Subject to any disclaimer, the term of this patent is extended or adjusted under 35 U.S.C. 154(b) by 286 days.

(21) Appl. No.: 11/888,070

(22) Filed: Jul. 31, 2007

Related U.S. Application Data

(63) Continuation-in-part of application No. 11/120,263, filed on May 3, 2005, now Pat. No. 7,269,513.

(51) Int. Cl.
*G08G 1/16* (2006.01)
(52) U.S. Cl. .................. 701/301; 701/66; 701/120; 701/207; 340/903
(58) Field of Classification Search .................... 701/3, 701/120, 206, 207, 200, 211, 215, 223, 301, 701/66; 340/901, 903, 425.5, 435, 426.19

See application file for complete search history.

(56) References Cited

U.S. PATENT DOCUMENTS 5,596,332 A * 1/1997 Coles et al. ................. 342/455
7,269,513 B2 * 9/2007 Herwitz ...................... 701/301

* cited by examiner

*Primary Examiner*—Gertrude Arthur Jeanglaud

(57) ABSTRACT

The invention is a sense-and-avoid display system that obtains position and/or velocity data for an unmanned aerial vehicle (UAV) and other aerial vehicles (AVs) from one or more radar and/or GPS data sources by wireless and/or wired data transfer pathways. The UAV and AV data are used to compute and display: present and projected future positions of UAV and other AVs; time and distance of closest approach between UAV and an AV; and recommended change in UAV's flight path and/or flight speed for conflict avoidance. This information is provided to the UAV pilot in 2D and 3D graphic displays.

In standard mode of operation, UAV position and/or velocity data are obtained from UAV ground control station (GCS), while data for other AVs are obtained from a non-GCS data source (e.g., radar). In an alternative mode, UAV and other AV data are obtained from the same non-GCS data source. This alternative is an option when UAV is equipped with an identification device (e.g., transponder) and UAV is distinguished from other AVs using data obtained from an AV identification system (e.g., IFF).

16 Claims, 13 Drawing Sheets

CLOSEST POINTS OF APPROACH DETERMINATION FOR UNMANNED AERIAL VEHICLE GROUND-BASED SENSE-AND-AVOID DISPLAY SYSTEM

This application is a Continuation In Part (CIP) of U.S. Ser. No. 11/120,263 filed May 3, 2005 now U.S. Pat. No. 7,269, 513. This invention relates to an unmanned aerial vehicle ("UAV") and a ground-based sense-and-avoid display system ("SAVDS") used for the purpose of UAV flight safety. The sense-and-avoid display system, hereafter referred to as the "system," provides the ground-based UAV pilot with a graphic display of information pertaining to airborne conflict detection and mid-air collision avoidance.

FIELD OF THE INVENTION

The novelties disclosed herein follow from the original invention in the Parent Application. The essence of the invention set forth in the Parent Application, which includes data processing, and the computation and display of airborne conflict (including audio and visual warnings), remains essentially the same. The CIP enhances the functionality of the method and system described in the Parent Application by: (i) processing data from a number of functionally equivalent data sources; (ii) refining the mathematical computations used to identify potential airborne conflict and determine whether a safe separation distance between the UAV and other aerial vehicles ("AVs") is being maintained; and (iii) using enhanced graphic methods to visually display the processed data and the results of the mathematical computations. The novelties were driven by the FAA requirement for UAVs to be operated with a level of safety equivalent to or better than a cockpit-based pilot's eyes in a manned aircraft.

BACKGROUND OF THE INVENTION

Use of an unmanned aerial vehicle ("UAV") for airborne surveillance, remote sensing, communications, atmospheric sampling and other related purposes is an attractive approach that, at its best, incorporates flexibility, flight safety, and meaningful data acquisition. However, for flight safety, the determination and display of the flight paths of two or more aerial vehicles ("AVs") in the same 3D airspace is not straightforward. Particularly challenging is estimating and displaying the time and distance of closest approach between two conflicting AVs, where one of the AVs is a ground-controlled UAV.

The critical steps for actual UAV collision avoidance is subdivided into two categories: (i) computations and recommendations provided by the system; and (ii) tasks performed by the UAV pilot. The UAV pilot is here defined as being equivalent to the UAV operator or controller responsible for changing the flight path and flight speed of the UAV for the purpose of collision avoidance.

What is needed is a sense-and-avoid display system that provides the UAV pilot with a graphic display of air traffic activity. The system needs to highlight potential airborne conflict involving the UAV, and provide recommendations for maintaining a safe separation distance between the UAV and other AVs in real time or near-real time.

SUMMARY OF THE INVENTION

These needs are met by the invention that involves refined mathematical computations for: (i) determining and displaying the three dimensional position and velocity coordinates and/or position and velocity vectors of the UAV and other AVs moving in the same airspace; (ii) estimating and displaying the time and distance of closest approach between the UAV and one or more other independent AVs; (iii) iteratively determining the modification of the UAV's position, velocity and/or acceleration vectors needed to maintain a safe separation distance from other AVs; and (iv) deriving the recommended change in the UAV's flight path and/or flight speed based on the modified position, velocity and/or acceleration vectors. The system provides a graphic display of this information and the associated audio and visual alerts to the UAV pilot responsible for executing changes in the UAV's manually controlled or programmed flight path.

If a change in the UAV flight path was performed automatically by an autopilot system without a human-in-the-loop, the information generated by the system could be transferred to an autopilot system having an open architecture.

DESCRIPTION OF THE INVENTION

Figure 1:
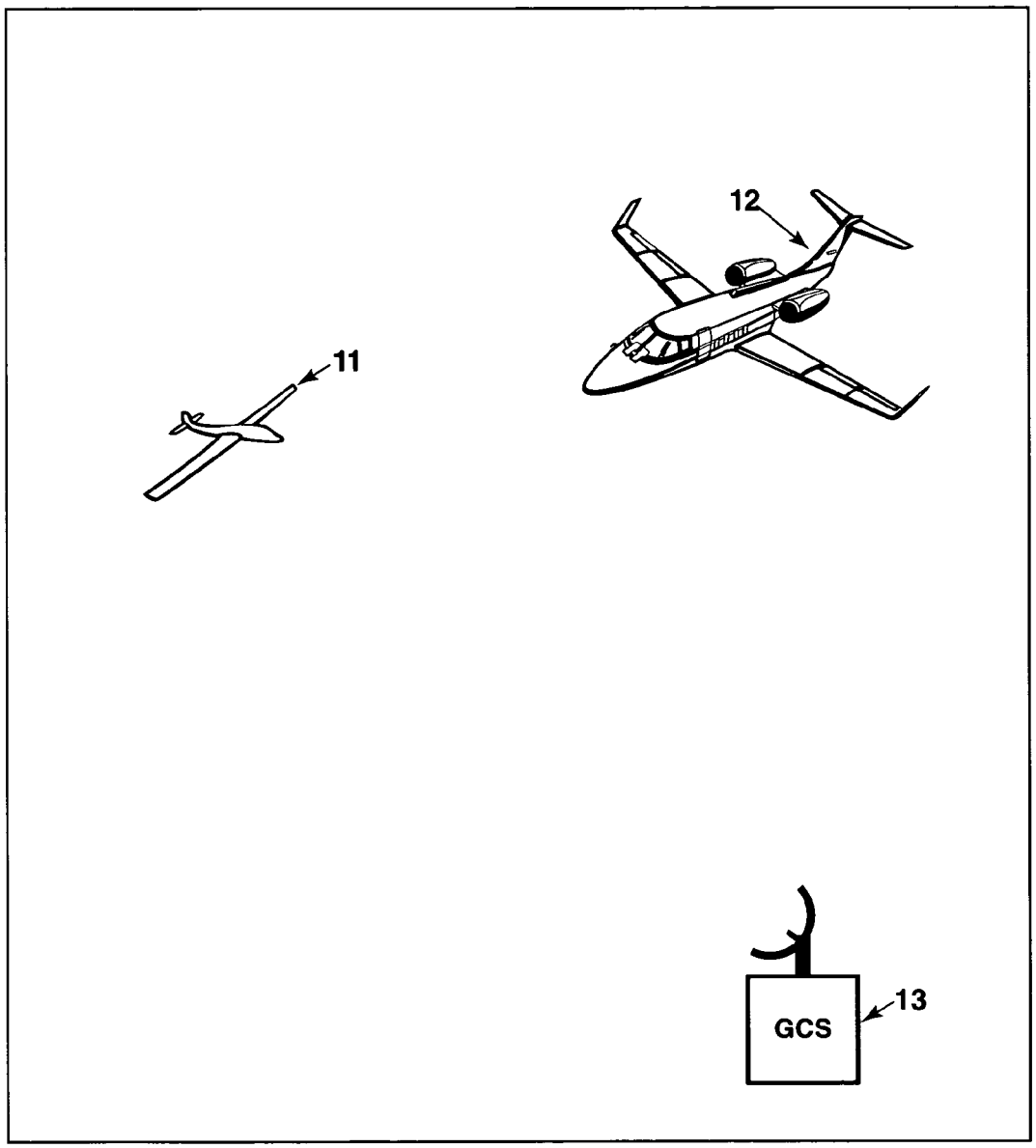
FIG. 1 illustrates use of the invention in one embodiment.

FIG. 1 illustrates use of the invention in one embodiment. This embodiment involves two aerial vehicles ("AVs"), 11 and 12, one or which is an unmanned aerial vehicle ("UAV") that is controllable by a UAV pilot based in a ground control station ("GCS"), 13.

Figure 2:
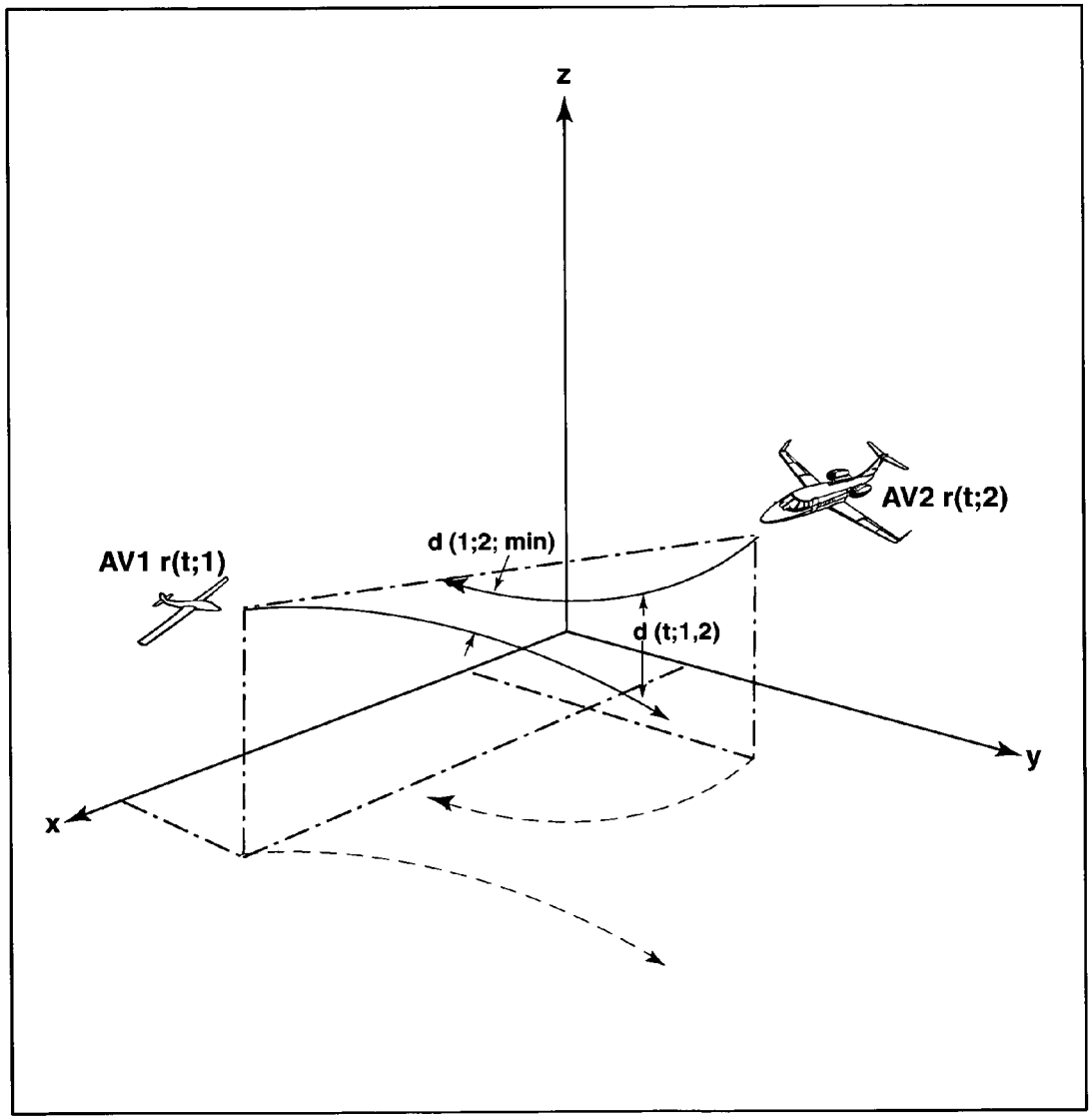
FIG. 2 illustrates collision avoidance in one embodiment.
Figure 3A:
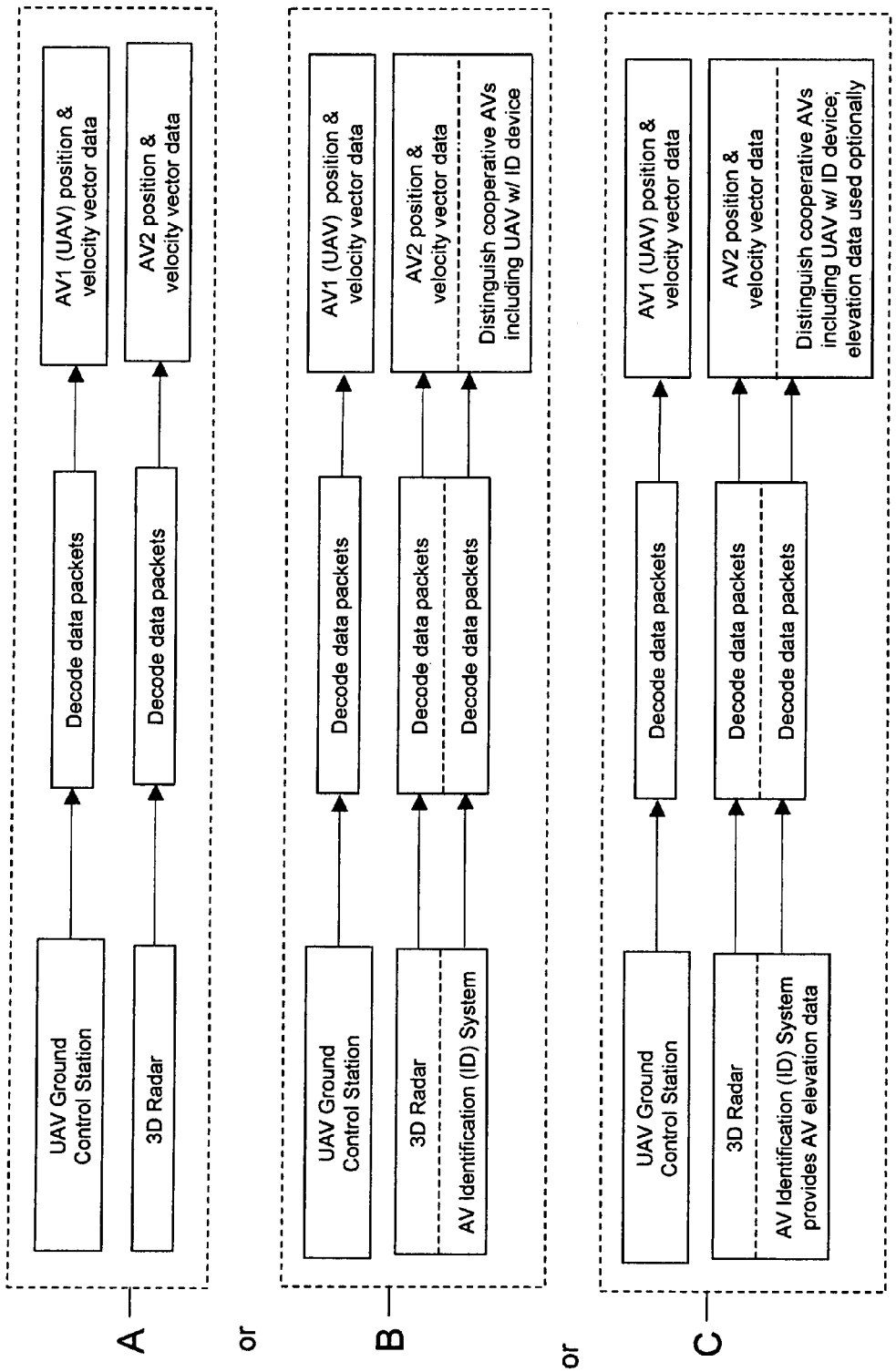
FIG. 3 illustrates the different combinations of Group I data sources for UAV and AV position and velocity data that includes the UAV Ground Control Station as a data source.
Figure 3B:
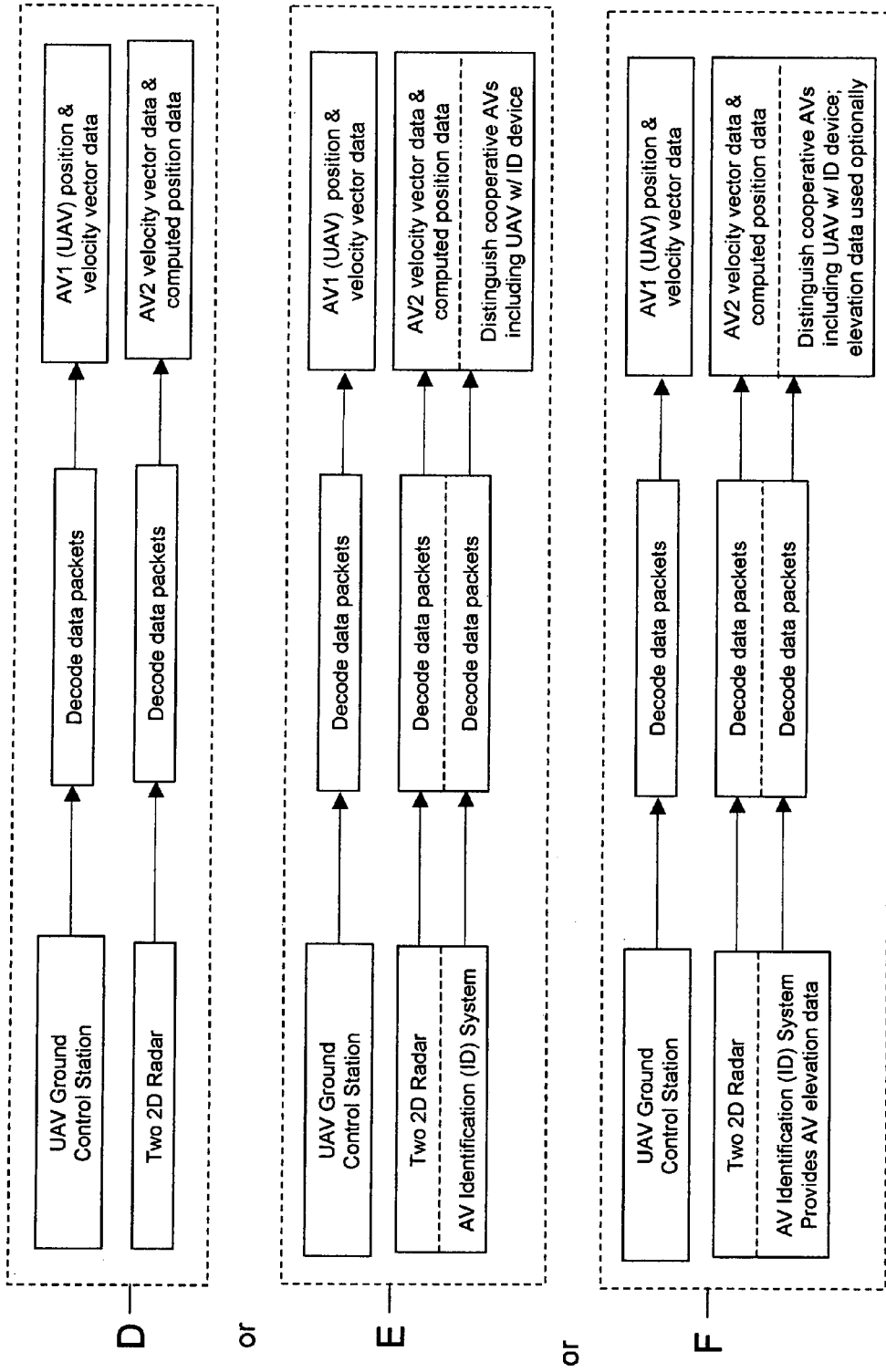
Figure 3C:
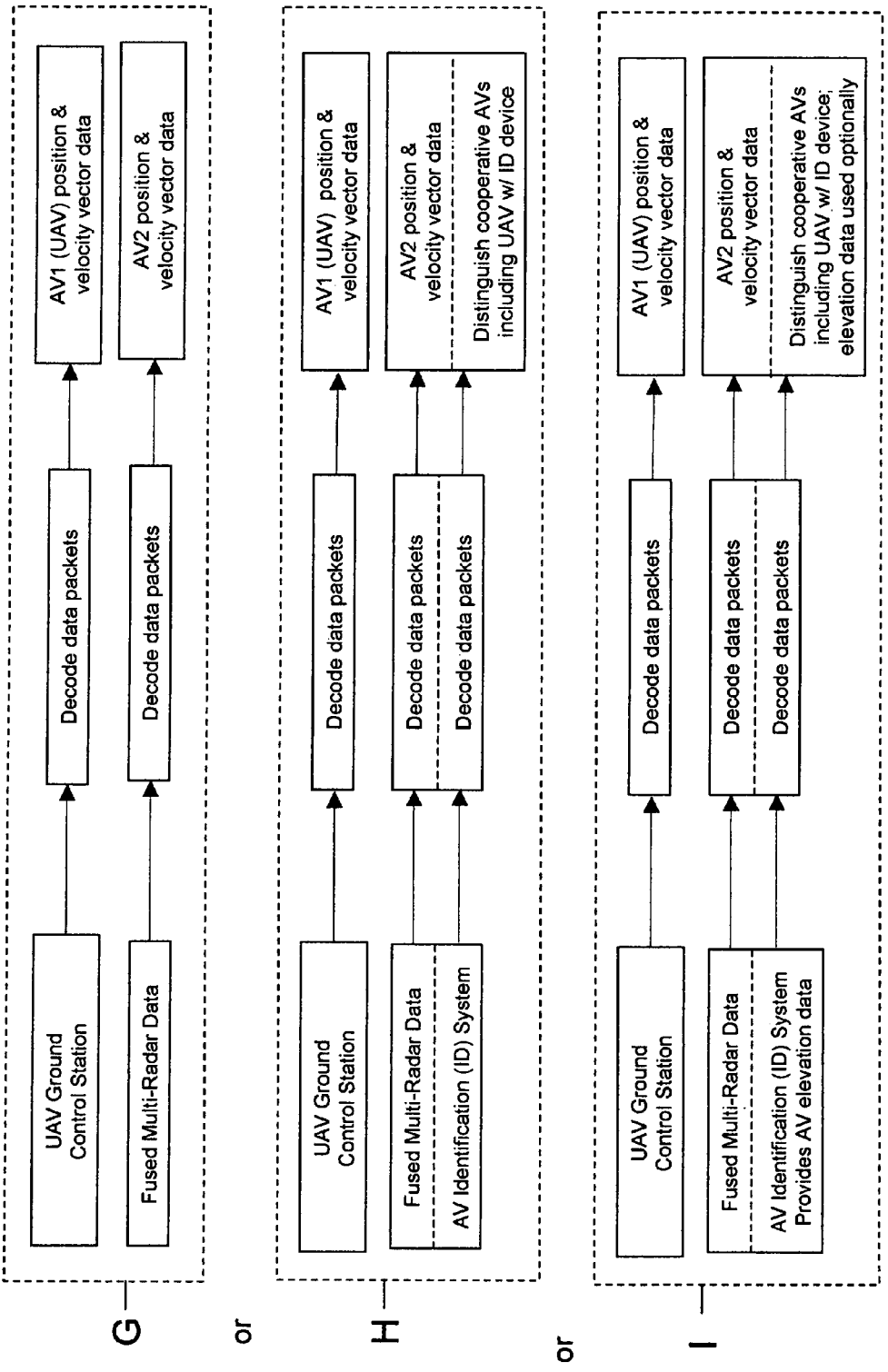
Figure 3D:
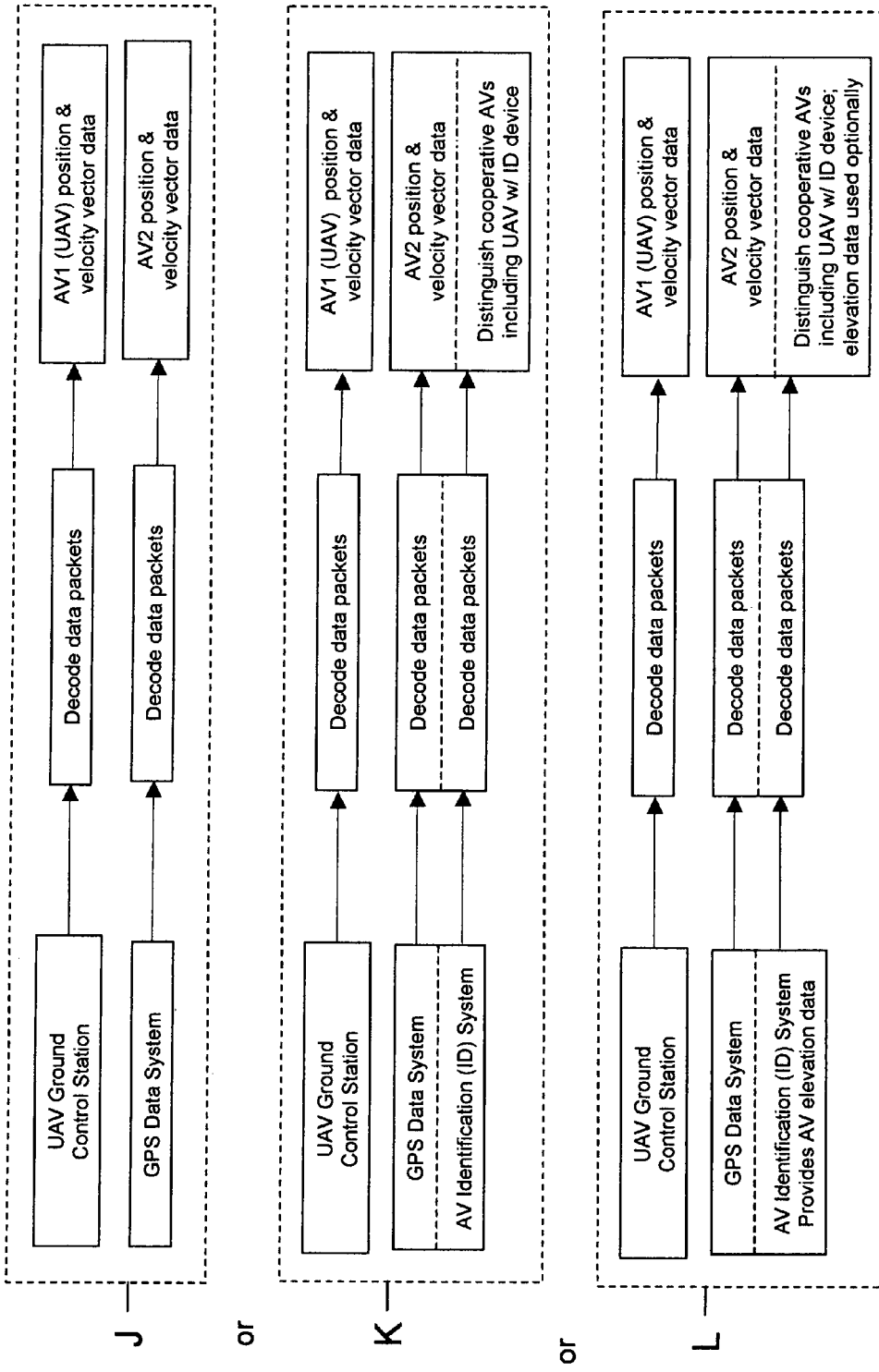
Figure 4A:
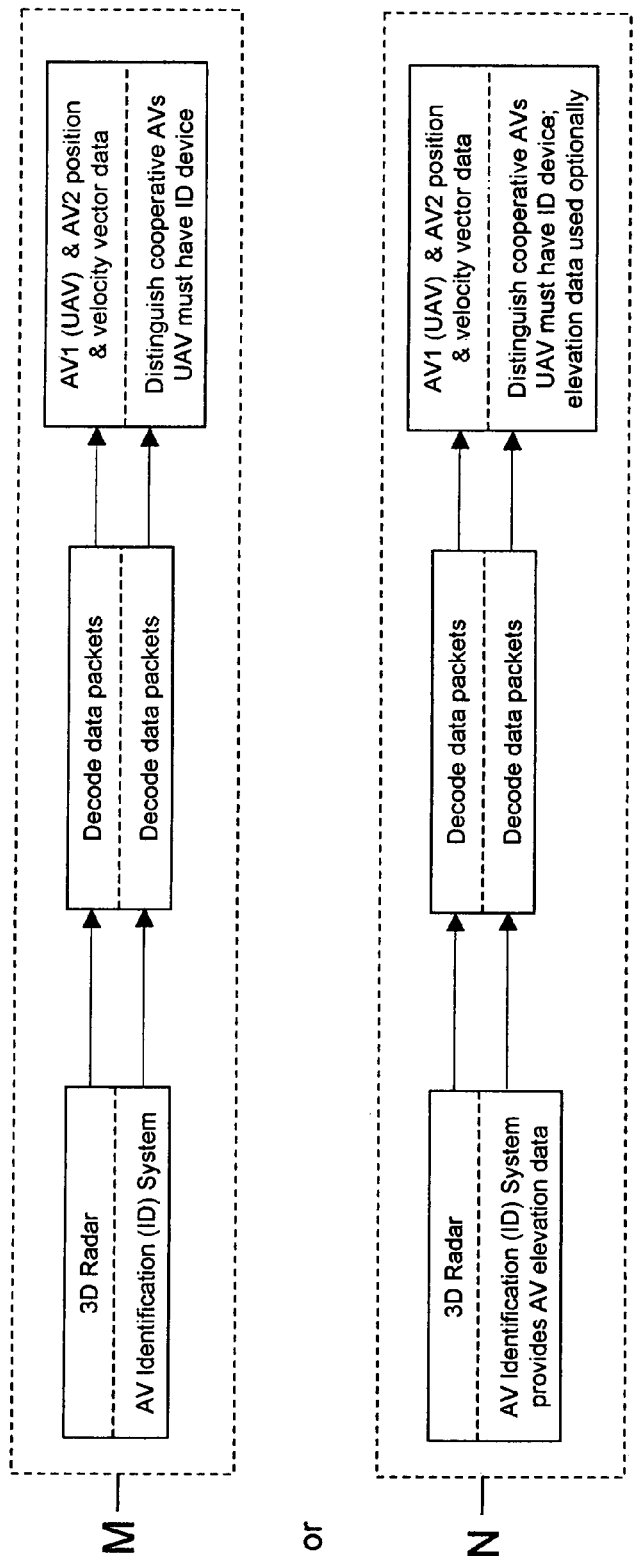
FIG. 4 illustrates the different combinations of Group II data sources for UAV and AV position and velocity data that do not include the UAV Ground Control Station as a data source.
Figure 4B:
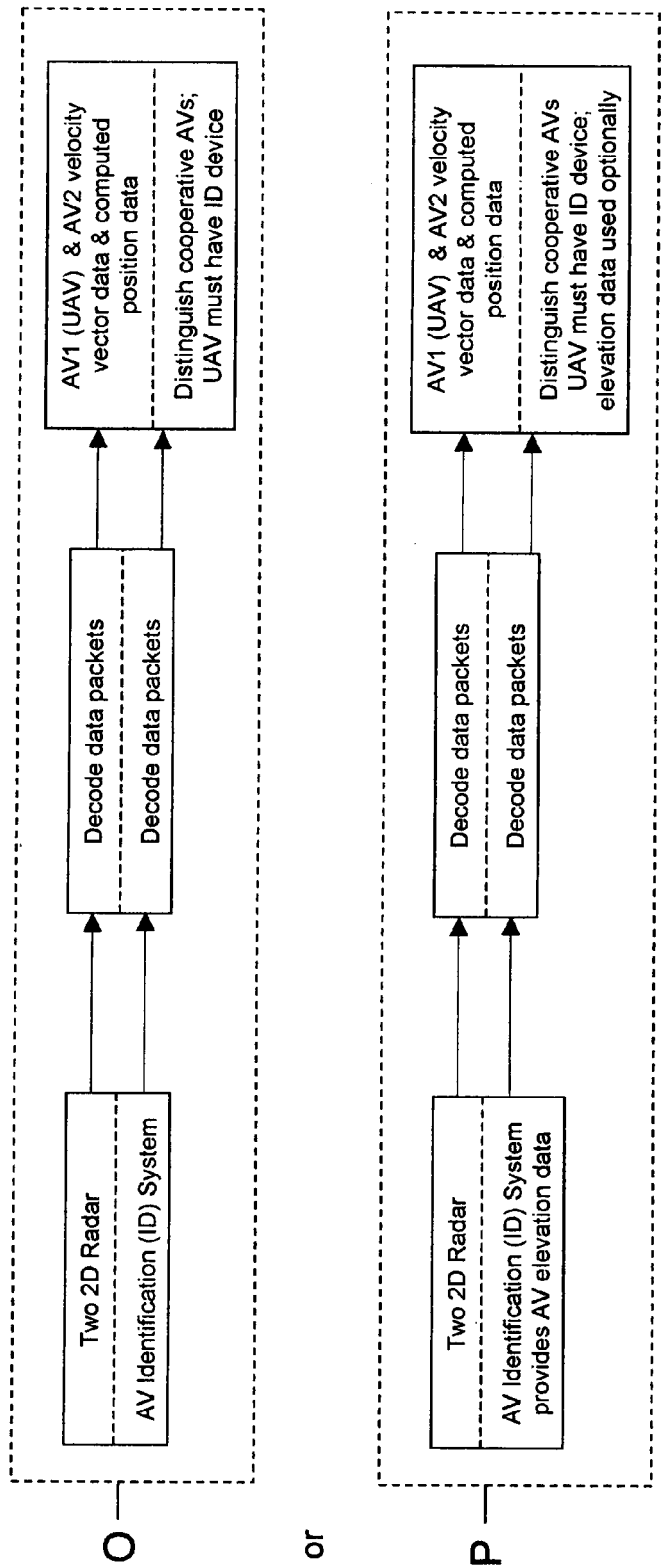
Figure 4C:
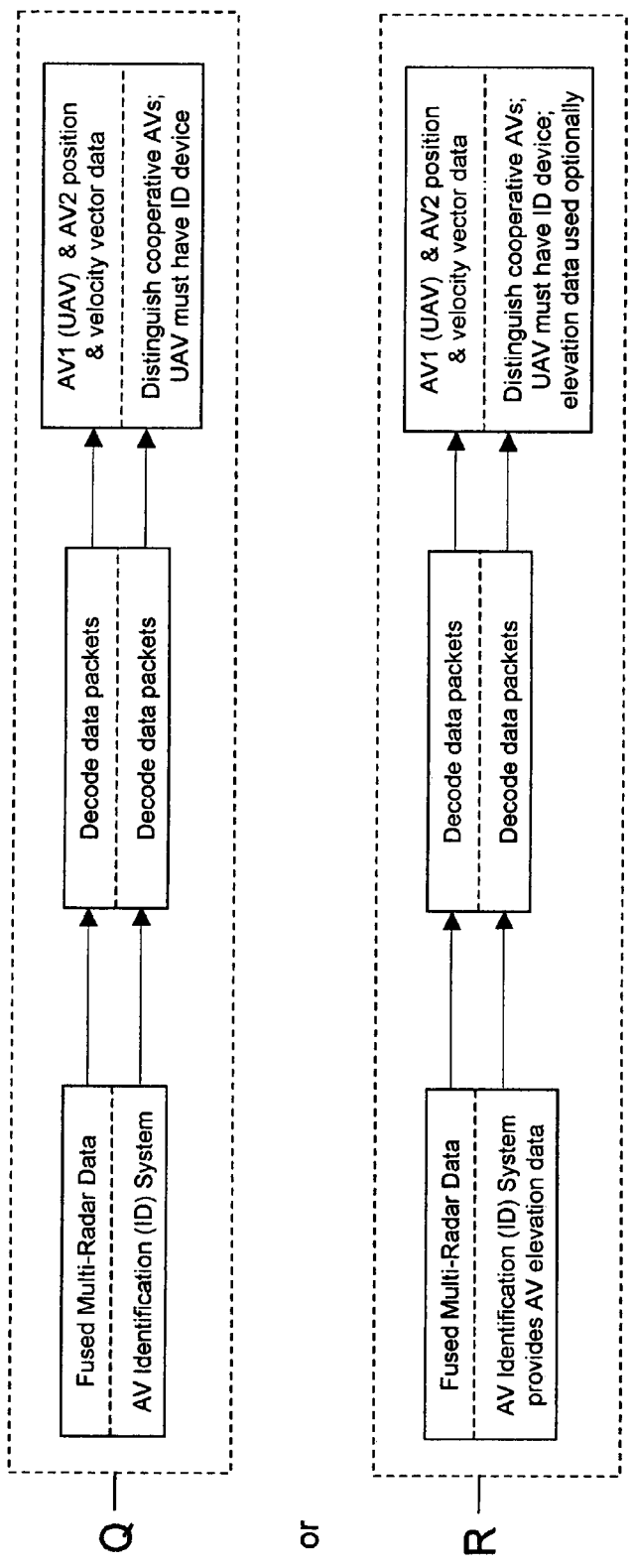
Figure 4D:
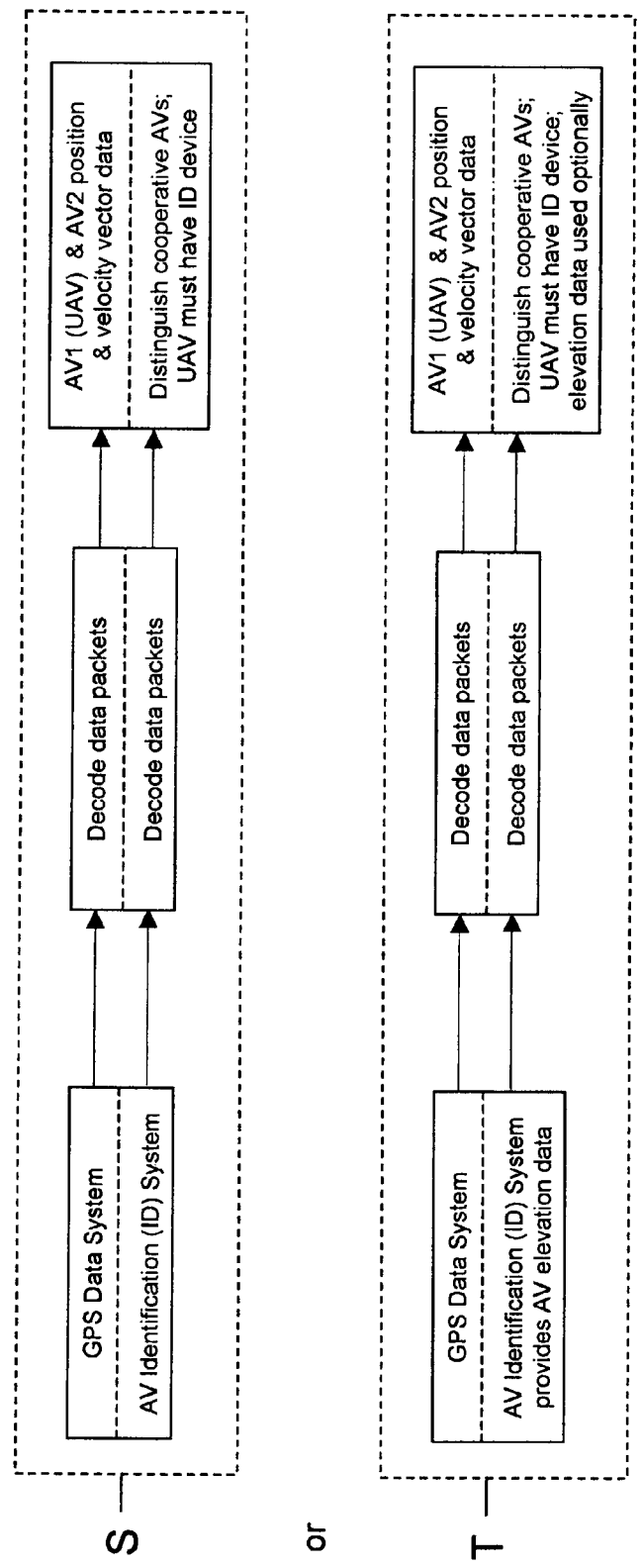

As the two AVs execute various motions, in their common airspace, it may become advisable for the UAV to modify its acceleration vector, or its velocity vector, so that the distance of closest approach, as illustrated in FIG. 2, is increased above a predefined threshold distance. In FIG. 2, AV no. u (u=1,2) has instantaneous position, velocity and acceleration vectors $a0(u)$, $a1(u)$ and $a2(u)$, and $a2(u=1)$.

Iterative computations are performed by the system to determine whether the separation distance between the UAV and another AV is less than the predefined safe separation distance threshold. In this circumstance, the system computes a modified acceleration vector for the UAV (AV no. 1) that will increase the distance of closest approach between the UAV and the other AV (AV no. 2). Using a graphic display, this information is provided to the UAV pilot responsible for the execution of conflict avoidance. The details of the Invention are set forth below.

UAV Warning Zone.

The system provides the user with options for defining the volume of airspace (e.g., a cylindrical ellipsoid) corresponding to the UAV "warning zone." This warning zone is the volume of airspace within which no part of another AV should enter. The parameter settings for the warning zone are adjustable. The default setting for the warning zone measures 2,000 ft above and below the position of the UAV, and extends 3 nautical miles laterally at flight heights less than 10,000 ft ASL (above sea level) to accommodate AVs flying at less than 250 knots. The warning zone expands laterally to 5 nautical miles at flight heights above 10,000 ft ASL, to accommodate AVs moving at greater than 250 knots.

Estimation of Distance of Closest Approach Between UAV and AV.

Consider two AVs, numbered AVu (u=1, 2), moving independently as illustrated in FIG. 2 where the UAV is AV1 and the other AV is AV2, with vector coordinates approximated over short time intervals as quadratic functions of time:

$$r(t;u) = a0(u) + a1(u)(t-t0) + a2(u)(t-t0)^2 \quad (u=1, 2), \tag{1}$$

where a0(u), a1(u) and a2(u) are two-dimensional or three-dimensional vector coefficients whose values are known or estimatable from the AV position coordinates developed in the preceding, and t0 is a selected time, such as initial time for observation. The acceleration vectors 2a2(u) can be obtained using the formalism of Appendix A. The estimated distance squared between the two AVs is $$d(t;1;2)^2 = \{a0(1)-a0(2)\}^2 + 2\{a0(1)-a0(2)\}\cdot\{a1(1)-a1(2)\}(t-t0) + \{\{a1(1)-a1(2)\}^2 + 2\{a0(1)-a0(2)\}\cdot\{a2(1)-a2(2)\}\}(t-t0)^2 + 2\{a1(1)-a1(2)\}\cdot\{a2(1)-a2(2)\}(t-t0)^3 + \{a2(1)-a2(2)\}^2(t-t0)^4, = |r(t;1)-r(t;2)|^2, \tag{2}$$

Minimizing $d(t;1;2)^2$ with respect to time produces a cubic equation in the variable $(t-t0)$:

$$2\{a0(1)-a0(2)\}\cdot\{a1(1)-a1(2)\} + 2\{\{a1(1)-a1(2)\}^2 + 2\{a0(1)-a0(2)\}\cdot\{a2(1)-a2(2)\}\}(t-t0) + 6\{a1(1)-a1(2)\}\cdot\{a2(1)-a2(2)\}\}(t-t0)^2 + 4\{a2(1)-a2(2)\}^2(t-t0)^3 = 0. \tag{3}$$

Equation (1) can be extended to polynomials of higher degree D ($\geq 2$) in the time variable (t-t0), but the distance minimization equation corresponding to Eq. (3) will be of degree 2D-1. For many purposes, in a steady flight segment, a prescription of present position, velocity and acceleration vectors is sufficient.

Two approaches for explicit solution of a cubic equation $$w^3 + Aw^2 + Bw + C = 0 \tag{4}$$

are available, one of which is presented in Appendix B. Either approach involves transformation of the cubic to an alternative form, $$w = p - A/3, \tag{5}$$

$$p^3 + (-A^2/3 + B)p + \{2A^3/27 - AB/3 + C\} = 0. \tag{6}$$

A real, non-negative solution $t-t0=t_e$ of represents a time value for which $d(t;1;2)^2$ reaches an extremum value, and this extremum value is a minimum or a maximum, according as $d(t;1;2)^2$ satisfies $$\partial^2\{d(t_e;1;2)^2\}/\partial t^2 > 0, \tag{7A}$$

or satisfies $$\partial^2\{d(t_e;1;2)^2\}/\partial t^2 < 0. \tag{7B}$$

Only Eq. (7A) is of interest here. Assuming that a real, non-negative time value, $t-t0=t_e(min)$, exists satisfying Eq. (7A), one compares $d(t_e(min);1;2)^2$ with a minimum radius squared, $r(1;2;min)^2$, for the "warning zone" to determine if the AVs no. 1 and no. 2 will pass too close to each other, within a threshold distance, $r(1;2;min)$. When $$d(t_e;1;2)^2 \leq r(1;2;min)^2, \tag{8}$$

at least one of the parameters a0(u), a1(u) and a2(u) (u=1 or 2) must be changed to avoid this situation. It is assumed here that the motion parameter a2(u) (acceleration) for AV no. 1 is controllable, where AV1 is the ground-controlled UAV. The system computes a sensitivity value $$S(a2(1)) = \partial\{d(t_e;1;2)^2\}/\partial a2(1) \tag{9}$$

and determines the signum (±) of S(a2(1)). The system replaces the "computed" acceleration value a2(1) with an incremented value a2(1)+Δa2(1), where Δa2(1) is positive (negative) if the signum of S(a2(1)) is positive (is negative), and recomputes the modified distance squared of closest approach $d(t_e;1';2)^2$, where the symbol 1' indicates that the acceleration parameter a2(1) has been modified to a2(1)+Δa2(1), This iteration process continues until the value $d(t_e;1;2)^2$ is at least equal to the threshold radius squared $r(1;2;min)^2$, when the minimum distance of closest approach of AV no. 1 and AV no. 2 is no longer within a predefined threshold of safe separation distance. The system then indicates that the acceleration vector a2(1) be changed to a2(1)+Δa2(1) to achieve this condition.

The computational equations used for the airborne conflicts between an AV and a ground-controlled UAV are made more precise by computations involving terms up to third degree (i.e., $(t-t0)^3$) in the position vectors r(t;u) in Eq. (1).

Sources of Data for Computations.

Minimum data needs for the computations are position and velocity coordinates and/or position and velocity vectors, hereafter referred to as "position and velocity data," for the UAV and for each of one or more other AVs at a time, t=t0. The system obtains the position and velocity data from one or more data sources by one or more wireless or wired data transfer pathways.

Different combinations of data sources are subdivided into two main groups. In Group I, the UAV ground control station ("GCS") functions as the data source for the UAV, and, as a result, the UAV is readily identified. Group I is the standard mode of operation for the system. In Group II, the GCS does not function as the data source for the UAV, and the UAV is distinguished from other AVs by a different method. Group II is an alternative mode of operation for the system.

In Group I, the position and velocity data for the UAV are obtained from the GCS, while the position and velocity data for the other AVs are obtained from at least one of a set of non-GCS data sources comprising: (i) one or more 3D radar systems; (ii) two or more 2D radar systems, (iii) fused data from multiple radar systems; and (iv) a GPS data system.

A single 3D radar system, such as the Sentinel radar manufactured by Thales Raytheon Systems, provides the needed information for the estimation of the position and velocity data for each AV. Where 3D radar is not available and 2D radar is used, two or more 2D radar data sources are needed. The computations used to determine the position and velocity data for an AV using two ground-based 2D radar systems is described in Appendix C.

In those cases in Group I when the non-GCS data source (e.g., radar) provides redundant position and velocity data that correspond to the UAV data obtained from the GCS, the redundant data are removed by one of two methods. The first method for removing redundant data requires that the UAV be equipped with an identification device (e.g., transponder) and that the non-GCS data be supplemented by AV identification data obtained from an AV identification system. Examples of an AV identification system include an Identification Friend or Foe (IFF) system or an Automatic Dependent Surveillance Broadcast (ASDB) system. In Group I, non-GCS data associated with the UAV's identification code are, thus, removed from the UAV-AV conflict computations and the graphic displays.

In one embodiment, the system is fully integrated with a radar data source. An example includes, but is not limited to, the Sentinel 3D radar manufactured by Thales Raytheon Systems. This radar system provides both radar and IFF data.

The second method for removing redundant data is an algorithm that identifies and eliminates the redundant display of an AV having position and velocity vectors that mirror the UAV. The "mirror algorithm" checks for the following two conditions: (i) for a small selected distance $\partial$, $|r(t;u=1)-r(t;u=2)| \leq \partial$ and (ii) for any time t1 and any time increment $\Delta t$, $r(t1+\Delta t;u=1)-r(t1; u=1)$ and $r(t1+\Delta t;u=2)-r(t1;u=2)$ are approximately parallel. If both conditions (i) and (ii) are satisfied, AV data mirroring the UAV are removed from the UAV-AV conflict computations and the graphic displays. This second method for removing redundant data is used for Group I when the UAV is not equipped with an identification device and/or when the non-GCS data are not supplemented by AV identification data.

In Group II, the position and velocity data for the UAV and the other AVs are obtained from at least one of a set of non-GCS data sources comprising: (i) one or more 3D radar systems; (ii) two or more 2D radar systems, (iii) fused data from multiple radar systems; and (iv) a GPS data system. Relying on a non-GCS data source for the UAV data requires that the UAV be equipped with an identification device, and that the non-GCS data be supplemented by AV identification data obtained from an AV identification system. Satisfying these requirements is the method used to distinguish the UAV from the other AVs. When the UAV is distinguished from the other AVs in the shared airspace, the system is operational.

Of the two data source groups, Group I is currently preferred because the GCS provides a reliable source for the UAV position and velocity vector data, with rapid data updates. In addition, the GCS provides position and velocity data for smaller UAVs that may not be reliably detected using radar as a data source.

The methods used for distinguishing a specific UAV from other AVs expands the functionality of the system by enabling different UAV pilots controlling different UAVs to use the same AV data from the same data source(s). Each system identifies the UAV being controlled by the UAV pilot, and performs the conflict detection and safe separation distance computations for that specific UAV. In this way, AV data obtained from the same data source(s) are analyzed differently by the system for each UAV pilot.

FIGS. 3 and 4 summarize the different combinations of data sources that the system uses to obtain UAV and AV position and velocity data. These data source combinations are labeled A to L in FIG. 3 and M to S in FIG. 4.

Graphic Displays of Information.

The system simultaneously or sequentially displays several windows of visual information to show the same data in either 2D or 3D graphic displays. In these graphic displays, the UAV and the other AVs are represented as visually distinct icons, where icon is here defined as any object, shape or symbol having a visually distinct color or texture.

Figure 5:
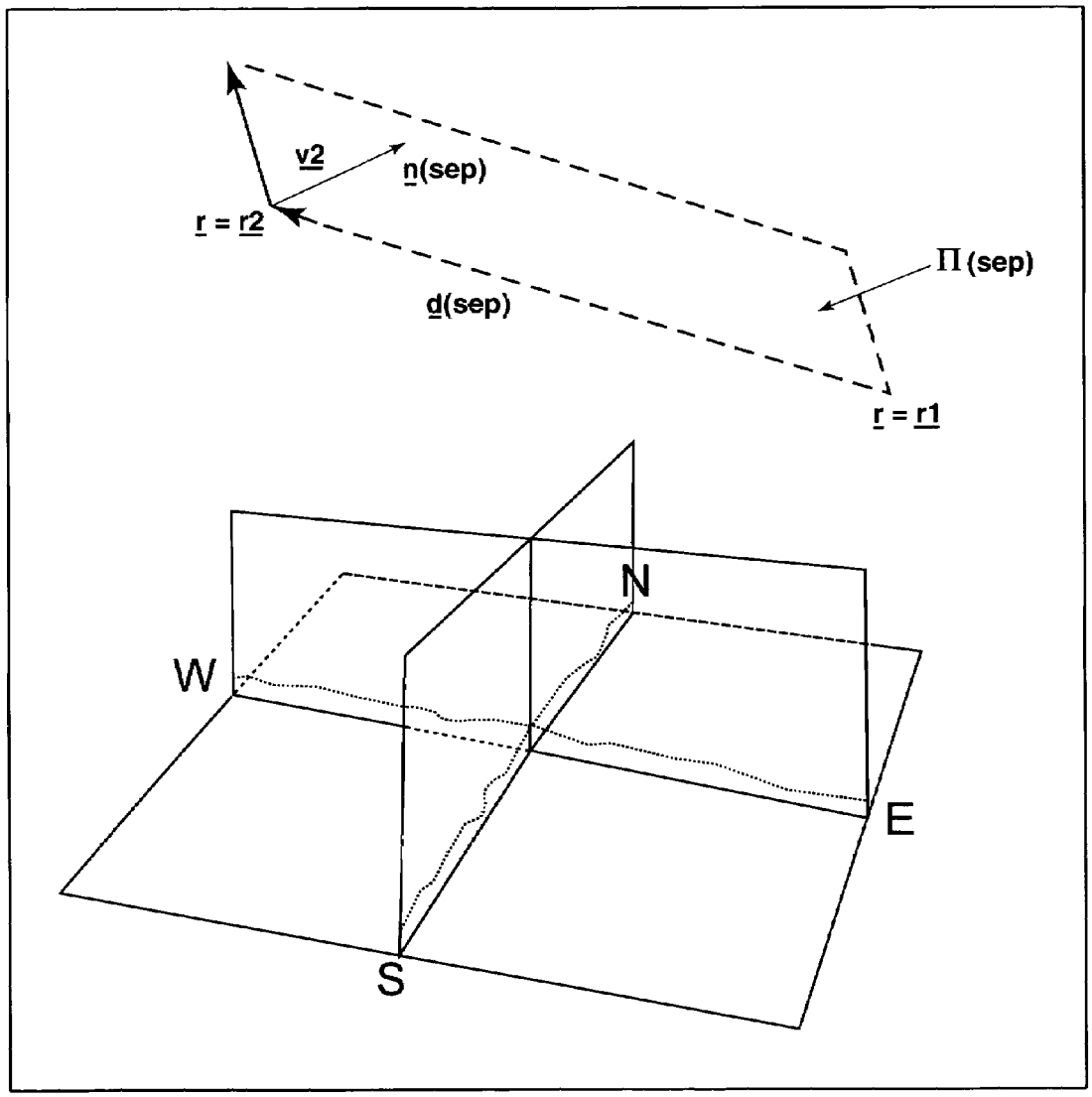
FIG. 5 illustrates definition of a separation plane $\Pi(sep;r1)$ according to the invention, with separation plane $\Pi(sep;r1)$ shown above a three dimensional structure comprising the ground surface, and vertically-oriented East-West and North-South elevation profiles.

The 2D graphic display is a multi-window display comprised of three viewing planes: (i) a nadir view, with a georeferenced 2D background map; (ii) an East-West vertically-oriented elevation profile, and (iii) a North-South vertically-oriented elevation profile. These three planes are shown in FIG. 5. The vertical elevation profiles supplement the nadir view, and, thus, provide a 3D perspective.

In the 2D graphic display, the display windows are adjustable to accommodate the different coverage areas of different data sources. The 2D graphic display has an optional function for close-up views of the elevation profiles. Close-up views of the elevation profiles are useful when a warning response has been activated. The default setting for close-up views of the elevation profiles shows airspace 2,000 ft above and 2,000 ft below the UAV to more clearly display the elevation difference between the UAV and one or more other AVs.

The 3D graphic display is functionally equivalent to the 2D graphic display; with the 2D display windows fused into a single 3D display window. The 3D display window is comprised of a semi-transparent 3D structure containing a georeferenced 3D map. The 3D structure is selected from a set of 3D structures including a rectangular parallelepiped, a cylinder, a sphere, an ellipsoid, a portion of a sphere and a portion of an ellipsoid. The 3D structure is rotatable for viewing the UAV and AV data from different perspectives.

UAV at Fixed Position in Center of Graphic Displays.

The system provides three options for defining fixed reference points in the center of the 3D graphic display and in the center of one or more of the planes in the 2D graphic display. Option I involves defining a user selected geographic position as the fixed reference point within the area of coverage of the AV data source. In Option II, the actual position of the data source (e.g., position of radar) is used as the fixed reference point. With the position of the data source as the fixed reference point, the UAV pilot views air traffic and potential conflicts in relation to the data source's coverage area (e.g., the radar coverage area).

Option III positions the icon representing the UAV in a fixed unchanging position in the center of one or more of the graphic displays. With the UAV in a fixed unchanging position, the changing position (i.e., flight path) of the UAV is represented by the changing position of the georeferenced background map. The changing positions of the other AVs are shown in relation to the fixed position of the UAV. Option III, thus, provides the UAV pilot with a UAV-centered view of the airspace surrounding the UAV.

Graphic Representation of UAV and Other AVs.

The UAV warning zone is shown as a semi-transparent 2D or 3D structure in one or more of the graphic display windows. The present positions of the UAV and the AVs are represented by icons selected from a set of distinctive colors, shapes and/or textures. Icon is here defined as any object, shape or symbol used to represent a UAV or AV. All icon selections are modifiable to suit UAV pilot preferences. The default setting for icon colors is as follows. The UAV is represented by a bright green icon. Cooperative AVs (here defined as being equipped with an identification device) having no conflict with the UAV above a selected flight elevation (e.g., above 20,000 ft ASL) are represented by beige icons. Cooperative AVs having no conflict with the UAV below a selected flight elevation (e.g., below 20,000 ft ASL) are represented by bright orange icons. Non-cooperative AVs (here defined as not being equipped with an identification device) are represented by bright yellow icons. False data feeds that are not consistently updated from the data source appear first as icons representative of non-cooperative AVs (e.g., yellow icons), but the system removes these icons from the graphic display.

The UAV pilot has the option of displaying vector lines showing the future position of the UAV and the AVs at selectable time intervals relative to the present, for example, spaced apart by 0.5, 1, 2, . . . 6 minutes. These future positions are shown in the graphic displays as linear or curvilinear vector lines projecting from the icons representing the present position of the UAV and the other AVs. This time series of vector lines provides the UAV pilot with a graphic display of potential conflicts, allowing an informed, thoughtful and unhurried decision for any needed change in the UAV's flight path and/or flight speed.

When a cooperative or non-cooperative AV enters the UAV warning zone and the distance of closest approach becomes less than the predefined "minimum separation distance" threshold, the icon representing the AV changes from a first color, shape or texture (e.g., bright orange or bright yellow) to a second color, shape or texture (e.g., white). When the separation distance between the UAV and an AV in the warning zone progressively decreases, the system responds in the following way: (i) the icon representing the intruding AV changes from a second color, shape or text (e.g., white) to a third color, shape or texture (e.g., red); (ii) the computed projected distance of closest approach based on the present UAV and AV position and velocity vectors is shown as the space between distinctly colored (e.g., red) vector lines projecting from the UAV and the AV and representing the projected future positions of the UAV and the AV; (iii) an audio voice issues an adjustable alert notice (e.g., "warning"); (iv) a line of text is presented in a display window showing the estimated time and distance of closest approach; (v) a line of text is presented showing the recommended change in the UAV's flight path or flight speeds needed for conflict avoidance; and (vi) a graphic display shows the recommended change in the UAV's flight path and/or flight speed.

When an airborne conflict is identified, a geometric plane, referred to as a separation plane (shown in FIG. 5 and described in Appendix D), is mathematically derived and made available for viewing in the 2D and 3D graphic displays. The separation plane, which is derived using the UAV and AV velocity vectors, shows the situation in 3D space in which the UAV and an AV are separated at a particular point in time by a separation vector. In the 3D graphic display, the separation plane is optionally shown as a plane that slices through the 3D structure. In the 2D graphic display, the separation plane is optionally tilted into a vertically-oriented profile view.

Additional System Enhancements.

The system is comprised of an expanded map library of georeferenced 2D and 3D background maps. The system allows the UAV pilot to shift back-and-forth between different background map types (e.g., aeronautical charts and topographic maps in the 2D graphic display) while the system is in operation. A selectable zoom factor associated with the graphic displays provides the UAV pilot with different fields of view (e.g., ranging from 10 to 100 nautical miles in diameter). Optionally, the zoom factor monotonically increases as a function of the relative velocity magnitude $|\Delta v_{rel}|$.

The UAV pilot has the option of selecting an AV of interest and obtaining a text display of the selected AV's flight information (e.g., flight elevation ASL; flight speed). For cooperative AVs equipped with an identification device, the identification code (e.g., transponder code) also is shown. Optionally, this flight information is shown in the graphic display windows as numeric values associated with the icon representing each AV. The trail corresponding to the preceding flight path of each AV is adjustable. The default setting is a trail showing 20 preceding positions for each AV and 40 preceding positions for the UAV.

In the 3D graphic display and in the nadir view plane of the 2D graphic display, GPS time and the calendar date are shown as UAV and AV data are being displayed. These time-date stamps remain embedded in the system log files that store the UAV and AV data from each UAV flight. UAV and AV data stored in the system log files are available for replaying and for the analysis of past UAV missions. The replays are run at different rates (faster or slower), and paused for closer viewing and still-frame storage. Still-frames are for printing scenes of interest. For UAV pilot training, the AV data are replayed independently of the UAV data, and combined with simulated UAV flight data. An executable subroutine, developed for extracting the flight history of each AV from the log files, provides quantitative summaries of air traffic activity during entire UAV missions in tabular or text form.

Procedure for Practicing Embodiment of the Invention.

A suitable stepwise procedure for practicing an embodiment of the invention is set forth below.

Step 1: Provide an estimate of a position vector a0(u), a vector velocity a1(u) and an acceleration vector 2a2(u) for each of two AVs, no. u=1 and u=2, at a selected time, t=t0.

Step 2: For a time interval t≧t0, estimate a vector position r(t;u) of AV no. u according to $$r(t;u)=a0(u)+a1(u)(t-t0)+a2(u)(t-t0)^2.$$

Step 3: Provide an estimate of a time, $t=t_e$, for which the difference $$|\Delta r(t)|2=|r(t;u=1)-r(t;u=2)|^2$$

has a locally minimum value $|\Delta r(t=t_e)|^2$ and an estimate of this minimum value.

Step 4: When the locally minimum value $|\Delta r(t=t_e)|^2$ is less than a selected safe separation distance threshold value $|\Delta r(min)|^2$, the system indicates that at least one acceleration vector a2(u) be modified so that, with the modified acceleration vector(s) used in Eq. (2), a modified minimum value $|\Delta r'(t=t'_e)|^2$ is estimated to be at least equal to $|\Delta r(min)|^2$.

Step 5: Display the original minimum value $|\Delta r(t=t_e)|^2$ and the modified minimum value $|\Delta r'(t=t'_e)|^2$.

Summary of New Features.

The sense-and-avoid display system (SAVDS) has the following innovations: (1) position and velocity coordinate and/or position and velocity vector data for an unmanned aerial vehicle (UAV) and other aerial vehicles (AVs) are obtained from one or more radar and/or GPS data sources by wireless and/or wired data transfer pathways; (2) the UAV and AV data are used to more precisely compute and display the present and projected future positions of the UAV and the other AVs in the same shared airspace, and the time and distance of closest approach between the UAV and an AV; (3) iterative computations are used to determine the modification of the UAV's position, velocity and/or acceleration vectors needed to maintain a safe separation distance from other AVs; (4) the recommended change in the UAV's flight path and/or flight speed is derived from the modified position, velocity and/or acceleration vectors; (5) the UAV pilot is presented with this information in 2D and 3D graphic displays that feature both audio and visual cues pertaining to UAV-AV conflict; (6) the UAV pilot has an optional UAV-centered view of the shared airspace that involves positioning the icon representing the UAV in a fixed unchanging position in the center of the graphic displays; (7) an expanded map library of georeferenced 2D and 3D background maps is used by the system's executable subroutine for the extraction of site-specific maps for the graphic displays; (8) time-date stamped UAV and AV data stored in log files are available for replaying and for analysis of past UAV missions; (9) an executable subroutine, developed for extracting the flight history of each AV from the log files, provides quantitative summaries of air traffic activity during entire UAV missions in tabular or text form; (10) the system functions when position and/or velocity data for the UAV are obtained from the UAV ground control station ("GCS"), while position and/or velocity data for other AVs are obtained from a non-GCS data source (e.g., radar); (11) the UAV GCS, however, is not a required source for the UAV data when the UAV is equipped with an identification device (e.g., transponder) and the UAV is distinguished from other AV using data obtained from an AV identification system (e.g., Identification Friend or Foe, IFF); (12) when the UAV is distinguished from other AVs, the system also functions using UAV and other AV data obtained from the same non-GCS data source.

APPENDIX A

Estimation Of Acceleration Vector Values

Given three or more velocity values for an aerial vehicle ("AV"), $$v(t)=vk \; (t=tk; \, k=1, 2, 3),\tag{A-1}$$

with $t1<t2<t3$, the quantity $$v(t;est)=v1(t-t2)(t-t3)/(t1-t2)(t1-t3)+v2(t-t1)(t-t3)/(t2-t1)(t2-t3)+v3(t-t1)(t-t2)/(t3-t1)(t3-t2)\tag{A-2}$$

satisfies Eqs. (A-1), with corresponding acceleration vector $$a(t;est)=dv(t;est)/dt=v1(2t-t2-t3)/(t1-t2)(t1-t3)+v2(2t-t1-t3)/(t2-t1)(t2-t3)+v3(2t-t1-t2)/(t3-t1)(t3-t2)\tag{A-3}$$

for $t1<t<t3$. Equation (A-3) allows an estimate of the acceleration vector a(t;est) to be made within this time interval, for example, at t=t2. A 3D radar, such as the Sentinel radar system, provides velocity coordinates for each AV. This formalism also is used to obtain velocity coordinates v at a particular time using an analogous procedure, where position coordinates r1, r2 and r3 are available for three spaced apart times.

APPENDIX B

Solution Of a cubic equation

Consider a cubic equation $$w^3+Aw^2+Bw+C=0\tag{B-1}$$

With the transformation $$w=p-A/3,\tag{B-2}$$

Eq. (B-1). becomes $$p^3+a1p+a2=0,\tag{B-3}$$

$$a1=-A^2/3+B,\tag{B-4}$$

$$a2=2A^3/27-AB/3+C.\tag{B-5}$$

A further transformation $$p=\{4a1/3\}^{1/2}u\tag{B-6}$$

transforms Eq. (B-3)

$$4u^3+3u=-3a2/\{4a1/3\}^{1/2}.\tag{B-7}$$

For real values of the variable q, the following identities are satisfied:

$$4\sin^3 q-3\sin q=-\sin 3q,\tag{B-8}$$

$$4\sin h^3 q+3\sin hq=\sin h3q.\tag{B-9}$$

Depending upon the signum ($\pm$) of the term $a1=-A^2/3+B$, one chooses the solution $$\sin 3q=-3a2/\{4a1/3\}^{1/2}.\tag{B-10}$$

or the solution $$\sin h3q=3a2/\{4a1/3\}^{1/2}.\tag{B-11}$$

APPENDIX C

AV Position Determination Using Ground-Based 2D Radar

Figure 6:
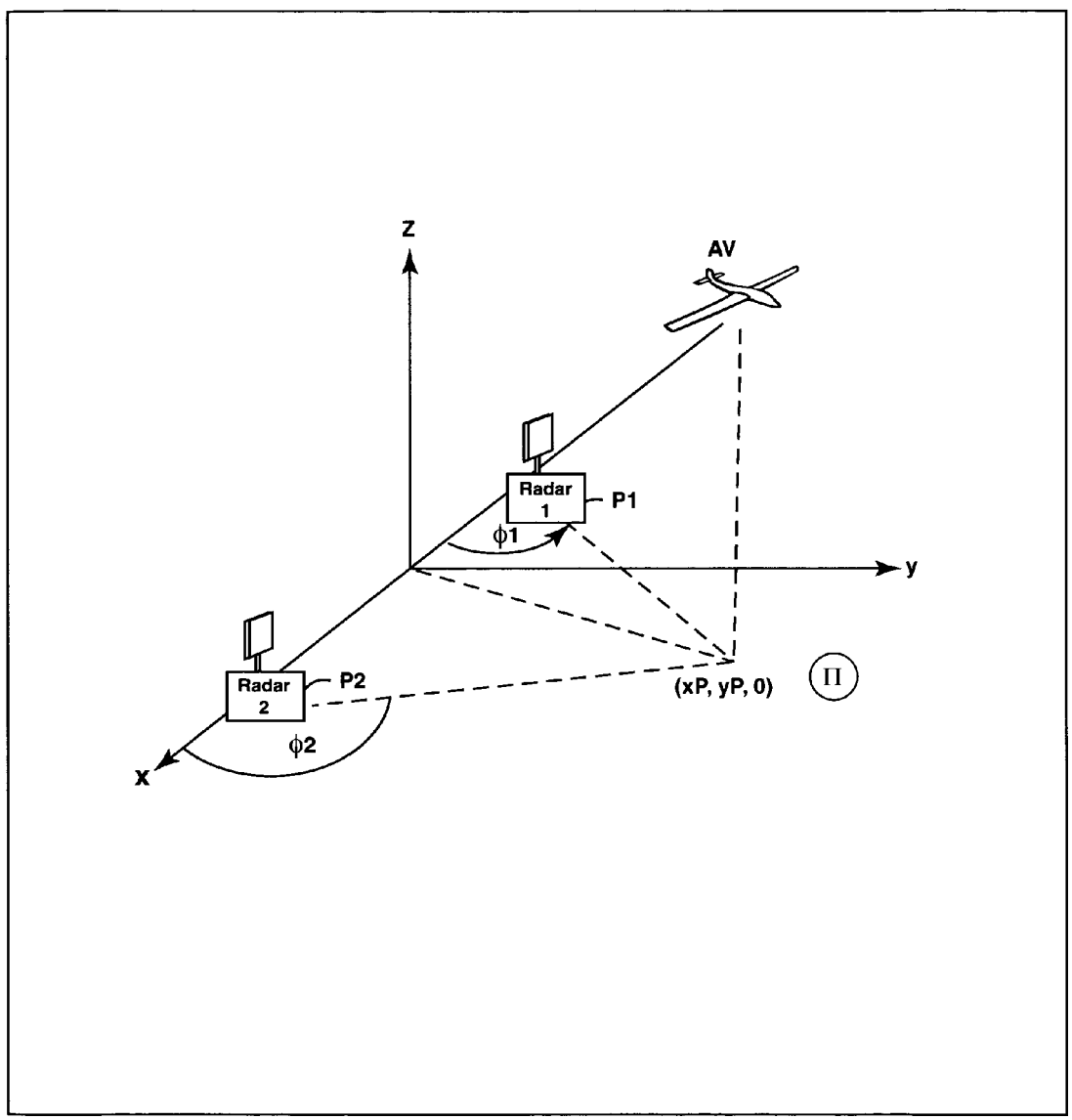
FIGS. 6 and 7 illustrate use of two radar signals to provide position coordinates for an identifiable AV.
Figure 7:
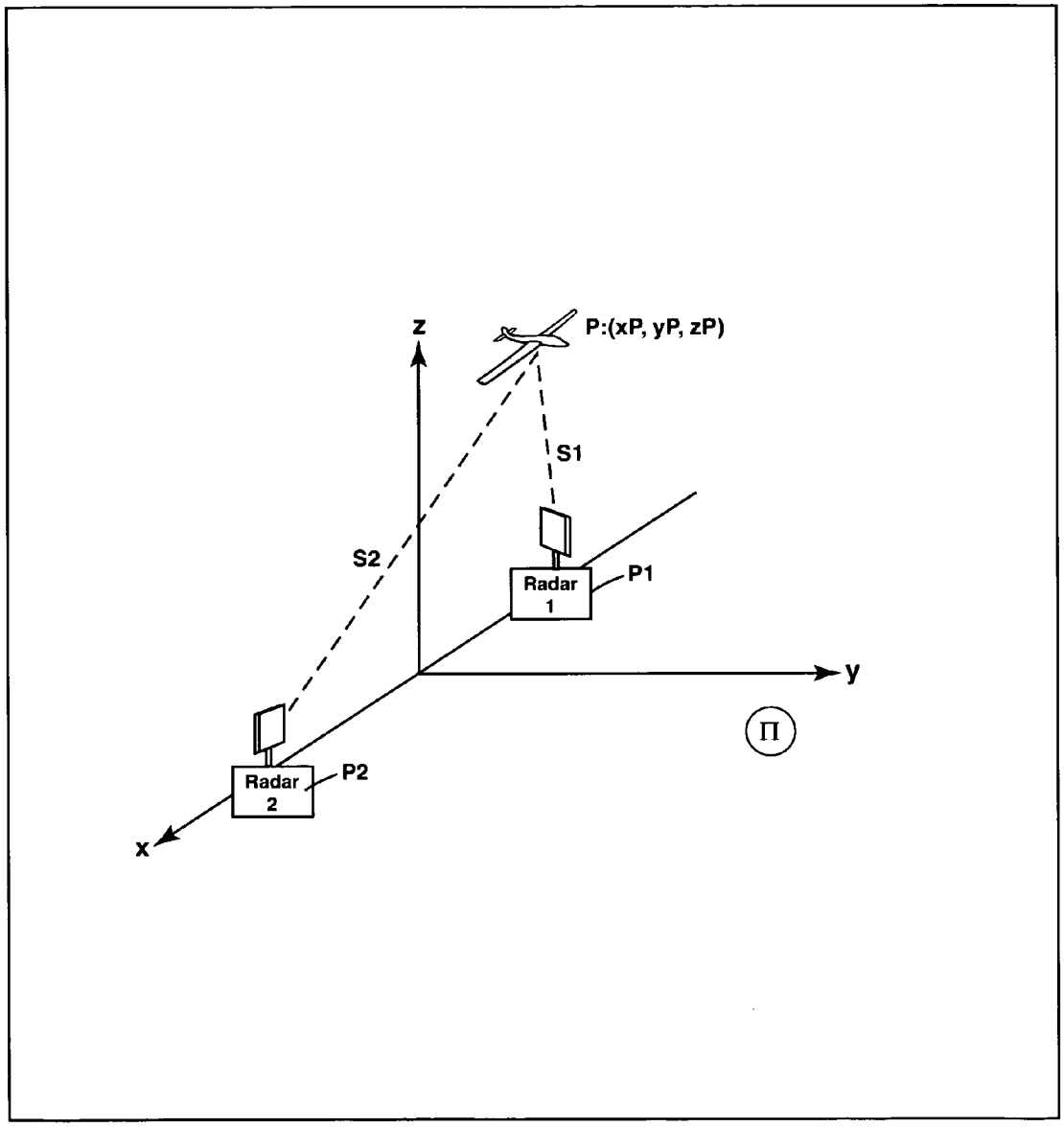

FIG. 6 schematically illustrates a substantially horizontal ground plane Π containing two spaced apart radar transmission/reception ("radar signal source") sites, at P1 and P2, with respective coordinates (x1,y1=0, z1=0) and (x1,y2=0,z2=0), that are to be used to estimate a projection $P_\Pi$ into the plane Π of a present position of an AV at position P (FIG. 7). The radar signal transmission mechanisms at P1 and P2 may operate independently or in a coordinated manner, and are assumed to each sweep at least a portion of the plane Π containing the projection $P_\Pi$ angular sectors with corresponding narrow angular sector widths ΔASW1 and ΔASW2 (e.g., ΔASW≈1-3°). The radar signal angular sectors independently sweep through the AV position P, but are assumed to do so at times that are sufficiently close that the AV position P does not change appreciably between the times the present position P is swept by the radar source at P1 and the next consecutive time the present position P is swept by the radar source at P2.

When the AV is at a position P, the center of the angular sweep sectors from the radar sources at P1 and P2 have corresponding azimuthal angles of $\phi 1$ and $\phi 2$, respectively, and the projection $P_\Pi$ has coordinates (xP,yP,zP=0), satisfying $$(xP-x1)\tan \phi 1=(xP-x2)\tan \phi 2,\tag{C-1}$$

$$yP=(xP-x1)\tan \phi 1=(xP-x2)\tan \phi 2,\tag{C-2}$$

$$xP=\{x1 \tan \phi 1-\phi 2 \tan \phi 2\}/(\tan \phi 1-\tan \phi 2),\tag{C-3}$$

$$yP=(x1-x2)\tan \phi 1 \tan \phi 2/(\tan \phi 1'-\tan \phi 2),\tag{C-4}$$

FIG. 7 schematically illustrates the present AV position P, having coordinates (xP,yP,zP), in three dimensions, in which the separation distances for P1–P and for P2–P are s1 and s2, estimated as $$s1=c\Delta t(P1/P/P1)/2,\tag{C-5}$$

$$s2=c\Delta t(P2/P/P2)/2,\tag{C-6}$$

where c is the electromagnetic signal propagation velocity in the ambient medium and Δt(Pk/P/Pk) is the radar transmission and return time interval for the gated radar signal at radar source Pk (k=1, 2). Assuming that the transmitted radar signal is received and reflected by the AV at position P with substantially zero time delay, the separation distances s1 and s2 are estimated as $$s1 = \{(Xp-x1)^2 + yP^2 + zP^2\}^{1/2},\quad\text{(C-7)}$$

$$s2 = \{(xP-x2)^2 + yP^2 + zP^2\}^{1/2},\quad\text{(C-8)}$$

from which one infers an approximation $$zP = \{\{s1^2 - (xP-x1)^2 - yP^2\}^{1/2} + \{s2^2 - (xP-x2)^2 - yP^2\}^{1/2}\}/2,\quad\text{(C-9)}$$

The coordinates xP and yP are obtained from Eqs. (C-3)-(C-4). FIGS. 6 and 7, and the corresponding mathematical discussion provide radar-based estimates of the coordinates (xP, yP, zP) for the present position P of the AV, assuming that the coordinates of the radar sources, P1 and P2, are known. The two radar sources may be part of a single radar system or may be obtained from separate radar systems that independently measure and provide the azimuthal angles, $\phi1$ and $\phi2$, and the separation distances, s1 and s2.

APPENDIX D

Description of a Separation Plane

FIG. 5 illustrates a situation in three dimensional space, in which the AV1 and AV2 are separated by a separation vector d(sep)=r2−r1, with corresponding velocity vectors v1 and v2. Assuming that d(sep) is not parallel to v2 so that the AV2 is not headed directly toward, or directly away from, the AV1, the vectors v2 and d(sep) define a plane H(sep) whose normal vector is determined by $$n(\text{sep}) = d(\text{sep}) \times v2 / \{|d(\text{sep}) \times v2|\} = (n_x, n_y, n_z)\quad\text{(D-1)}$$

Given the present position vector r1=(x1,y1,z1) of the AV1 (where AV1 is the controllable UAV), the equation of the particular plane Π(sep;r1) that passes through the present position (x1,y1,z1) of the AV1 is $$n(\text{sep}) \cdot (r - r1) = 0\quad\text{(D-2)}$$

or $$n(\text{sep}) \cdot r = n_x x + n_y y + n_z z = n(\text{sep}) \cdot r1.\quad\text{(D-3)}$$

The plane Π(sep;r1) is a real geometric plane and used to simultaneously display: (i) the present displacement vector d(sep) and its associated length, (ii) the present velocity vector v2 of the AV2 in this plane (not a projection the velocity vector v2 actually lies in this plane, by construction), and (iii) the position r1. The vector r1 will likely change relatively quickly with time. However, the velocity vector v2 will change relatively slowly, if at all, with time. The plane Π(sep;r1) will not usually coincide with a vertical profile plane or with a horizontal profile plane, and the defining normal vector n(sep) will usually be oriented in a direction having non-zero horizontal and vertical components. The plane Π(sep;r1) can be replaced by Π(sep;r2), which passes through r2 rather than through r1, if desired. The plane Π(sep;r1) may be displayed as part of a transparent cube (e.g., defined by two spaced apart East-West elevation profile planes, by two spaced apart North-South elevation profile planes, and by two spaced apart horizontal profile planes).

The separation plane Π(sep;r1) optionally displays the position r1, the separation vector d(sep)=r2−r1, and the instantaneous (or time delayed) velocity vector v2, all of which lie in the separation plane, as illustrated in FIG. 5.

Thus, the separation plane is an actual plane, not an artificial plane, in the system at a particular point in time. This plane also can be embedded in a transparent rectangular parallelepiped (e.g., a cube), defined by two spaced apart horizontal (nadir view) planes, first and second spaced apart vertically-oriented planes (e.g., East-West), and third and fourth spaced apart vertically-oriented planes (e.g., North-South) that are substantially perpendicular to the first and second vertically oriented planes, in order to clarify the present spatial relationship of the first and second AVs. In general, the separation plane will not be parallel to any of the nadir view, East-West or North-South planes. The semi-transparent rectangular parallelepiped can be replaced by another semi-transparent structure, such as part or all of a sphere or ellipsoid, oriented in a selected direction.

What is claimed is:

1. A computer-based method for estimating and displaying time and distance of closest approach of first and second aerial vehicles ("AVs"), numbered AVu (u=1, 2), with at least the first AV being an unmanned aerial vehicle ("UAV") controlled from a Ground Control Station ("GCS"), the method comprising:

for a selected time t=t0, providing an estimate of a position vector a0(u), a velocity vector a1(u) and an acceleration vector 2a2(u) of AV no. u;

for a time interval t≧t0, estimating a future position vector of AV no. u (u=1, 2) as $$r(t;u) = a0(u) + a1(u)(t-t0) + a2(u)(t-t0)^2;$$

estimating a time of closest approach, t=$t_e$, greater than t0 for which a difference $$|\Delta r(t)|^2 = |r(t;u=1) - r(t;u=2)|^2$$

has a locally minimum value, and estimating a distance squared of closest approach $$|\Delta r(t=t_e)|^2;\text{ and}$$

when $|\Delta r(t=t_e)|^2$ is less than a selected safe separation distance squared threshold value $|\Delta r(\min)|^2$, modifying the acceleration vector a2 for the UAV to a modified acceleration vector a2' so that, with the modified acceleration vector a2' used to compute a modified time value t=$t'_e$ and to compute and display a modified distance squared of closest approach value, $|\Delta r'(t=t'_e)|^2$, the modified distance squared of closest approach value is greater than the safe separation distance squared threshold value $|\Delta r(\min)|^2$.

2. The method of claim 1, further comprising estimating said time of closest approach, t=$t_e$, for which said difference $|\Delta r(t)|^2$ has a locally minimum value as a real solution of a cubic equation in said time variable t.

3. The method of claim 2, further comprising providing, $$2\{a0(1)-a0(2)\}\cdot\{a1(1)-a1(2)\}+2\{\{a1(1)-a1(2)\}^2+2\{a0(1)-a0(2)\}\cdot\{a2(1)-a2(2)\}\}(t-t0)+6\{a1(1)-a1(2)\}\cdot\{a2(1)-a2(2)\}\}(t-t0)^2+4\{a2(1)-a2(2)\}^2(t-t0)^3=0$$

as said cubic equation.

4. The method of claim 1, further comprising:

estimating said position vector and said velocity vector for said first and second AVs at a time, t=t0, from data obtained from at least one UAV Ground Control Station ("GCS");

estimating position vectors and velocity vectors for at least said second AV at a time, t=t0, from data obtained from at least one of a set of data sources comprising: (i) one or more ground-based 3D radar systems, (ii) two or more ground-based 2D radar systems, (iii) fused data from multiple radar systems, and (iv) one or more GPS data systems;

wherein said data from said GCS and from said data sources are obtained by wireless and/or wired data transfer pathways.

5. The method of claim 1, further comprising:

estimating position vectors and velocity vectors for said first and second AV at said time, t=t0, from data obtained from at least one of a set of data sources comprising: (i) one or more 3D radar systems, (ii) two or more 2D radar systems, (iii) fused data from two or more radar systems, and (iv) one or more GPS data systems;

wherein none of said data for said first AV is obtained from a UAV Ground Control Station ("GCS");

wherein said first AV is equipped with an identification device read by at least one or more AV identification system;

wherein the system includes obtaining AV identification data from at least one AV identification system;

wherein the data from the data sources and from the at least one AV identification system are obtained by wireless and/or wired data transfer pathways.

6. The method of claim 1, further comprising:

displaying in a least one of a two dimensional (2D) and a three dimensional (3D) graphic display:

(i) said estimated future position vectors of said first and second AVs, (ii) said estimated time and distance of closest approach between two conflicting AVs, with at least one of the two conflicting AVs being said first AV controlled from a GCS, and (iii) said modified acceleration vector of said first AV;

wherein said 2D graphic display is a multi-window display comprising a nadir view with a georeferenced 2D background map, a North-South vertically-oriented elevation profile, and an East-West vertically-oriented elevation profile;

wherein said 3D graphic display is a single-window display comprising a semi-transparent 3D structure containing a georeferenced 3D map;

wherein said 3D structure includes at least one of a set of 3D structures comprising a rectangular parallelepiped, a cylinder, a sphere, an ellipsoid, a portion of a sphere and a portion of an ellipsoid;

wherein said 3D structure is rotatable for viewing from different perspectives in the said 3D graphic display;

wherein a fixed reference point in a center of said 2D and 3D graphic displays is chosen from a set comprised of: (i) position of said first AV, (ii) position of a radar system functioning as a data source, and (iii) position selected by a user;

wherein, with said first AV chosen as fixed reference point in a center of said 2D graphic display, a changing position of first AV is shown by a changing position of said georeferenced 2D background map in nadir view;

wherein, with said UAV chosen as fixed reference point in said 3D graphic display, a changing position of an AV is shown by a changing position of said georeferenced 3D map.

7. The method of claim 6, further comprising:

determining whether position vector and velocity vector of an AV obtained from a non-GCS data source duplicates position vector and velocity vector of the AV obtained from a GCS;

wherein position vectors, r(t;u=1) and r(t;u=2), representing position vectors for said first AV and said other AV, respectively, satisfy two conditions: (i) for a small selected distance $\partial$, $|r(t;u=1)-r(t;u=2)| \leq \partial$ and (ii) for any time t1 and any non-zero time increment $\Delta t$, $r(t1+\Delta t;u=1)-r(t1; u=1)$ and $r(t1+\Delta t;u=2)-r(t1;u=2)$ are approximately parallel; and when conditions (i) and (ii) are both satisfied, removing AV data representing at least one redundant vector r(t1;u=1) and r(t;u=2) from closest approach computations and from said 2D and 3D graphic displays.

8. The method of claim 6, further comprising:

estimating position coordinates for said first AV for at least one of two spaced apart observation times, t=t'0 and t=t"0, that differ from t=t0;

using the estimated position coordinates for said time t=t0 and for the at least one other observation time to estimate a velocity vector v(1) having velocity coordinates ($v_x$, $v_y$, $v_z$) for said first AV at said time t=t0;

estimating position coordinates (x',y',z') at said time t=t0 for said second AV that is spaced apart from said first AV;

providing a separation vector $\Delta r(1;2)$ connecting position vectors having coordinates (x,y,z) and (x',y',z') at said time t=t0;

providing a separation plane, defined by the vectors v(2) and $\Delta r(1;2)$, corresponding to said time t=t0; and displaying the vectors v(2) and $\Delta r(1;2)$ and said position r1 in the separation plane corresponding to said time t=t0 in at least one of said 2D and 3D graphic displays.

9. A system for estimating and displaying time and distance of closest approach of first and second aerial vehicles ("AVs"), numbered AVu (u=1, 2), with at least the first AV being an unmanned aerial vehicle ("UAV") controlled from a Ground Control Station ("GCS"), the system comprising a computer that is programmed:

for a selected time t=t0, to provide an estimate of a position vector a0(u), a velocity vector a1(u) and an acceleration vector 2a2(u) of AV no. u;

for a time interval $t \geq t0$, to estimate the future position vector of AV no. u (u=1,2) as $$r(t;u)=a0(u)+a1(u)(t-t0)+a2(u)(t-t0)^2;$$

to estimate time of closest approach, $t=t_e$, greater than t0 for which a difference $$|\Delta r(t)|^2 = |r(t;u=1)-r(t;u=2)|^2$$

has a locally minimum value, and estimating a distance squared of closest approach $$|\Delta r(t=t_e)|^2;$$

when $|\Delta r(t=t_e)|^2$ is less than a selected safe separation distance squared threshold value $|\Delta r(min)|^2$, modifying the acceleration vector a2 for said first AV to a modified acceleration vector a2' so that, with the modified acceleration vector a2' used to compute a modified time value $t=t'_e$ and to compute and display a modified distance squared of closest approach value, $|\Delta r'(t=t'_e)|^2$, the modified distance squared of closest approach value is greater than the safe separation distance squared threshold value $|\Delta r(min)|^2$.

10. The system of claim 9, wherein said computer is further programmed to estimate said time of closest approach, $t=t_e$, for which said difference $|\Delta r(t)|^2$ has a locally minimum value as a real solution of a cubic equation.

11. The system of claim 10, wherein said computer is further programmed to provide $$2\{a0(1)-a0(2)\}\cdot\{a1(1)-a1(2)\}+2\{\{a1(1)-a1(2)\}2+ 2\{a0(1)-a0(2)\}\cdot\{a2(1)-a2(2)\}\}(t-t0)+6\{a1(1)- a1(2)\cdot\{a2(1)-a2(2)\}\}(t-t0)^2+4\{a2(1)-a2(2)\}^2(t- t0)^3=0$$

as said cubic equation.

12. The system of claim 9, wherein said computer is further programmed:
   to estimate said position vector and said velocity vector for said first AV at a time, t=t0, from data obtained from at least one UAV Ground Control Station ("GCS");
   to estimate position vectors and velocity vectors for said second AV at a time, t=t0, from data obtained from at least one of a set of data sources comprising: (i) one or more ground-based 3D radar systems, (ii) two or more ground-based 2D radar systems, (iii) fused data from multiple radar systems, and (iv) one or more GPS data systems;
   wherein said data from said GCS and said data sources are obtained by wireless and/or wired data transfer pathways.

13. The system of claim 9, wherein said computer is further programmed:
   to estimate position vectors and velocity vectors for said first and second AVs at a time, t=t0, from data obtained from at least one of a set of data sources comprising: (i) one or more ground-based 3D radar systems, (ii) two or more ground-based 2D radar systems, (iii) fused data from multiple radar systems, and (iv) one or more GPS data systems;
   wherein the system does not obtain data for said first AV from a UAV Ground Control Station ("GCS");
   wherein said first AV is equipped with an identification device read by at least one or more AV identification system;
   wherein the system includes obtaining AV identification data from at least one or more AV identification system;
   wherein said data from said GCS and said data sources are obtained by wireless and/or wired data transfer pathways.

14. The system of claim 9, wherein said computer is further programmed:
   to display in a least one of a two dimensional (2D) and a three dimensional (3D) graphic display:
   (i) said estimated future position vectors of said first and second AVs,
   (ii) said estimated time and distance of closest approach between two conflicting AVs, with at least one of the two conflicting AVs being said first AV controlled from a GCS, and
   (iii) said modified acceleration vector of said first AV;
   wherein said 2D graphic display is a multi-window display comprising a nadir view with a georeferenced 2D background map, a North-South vertically-oriented elevation profile, and an East-West vertically-oriented elevation profile;
   wherein said 3D graphic display is a single-window display comprising a semi-transparent 3D structure containing a georeferenced 3D map;
   wherein said 3D structure includes at least one of a set of 3D structures comprising a rectangular parallelepiped, a cylinder, a sphere, an ellipsoid, a portion of a sphere and a portion of an ellipsoid;
   wherein said 3D structure is rotatable for viewing from different perspectives in the said 3D graphic display;
   wherein a fixed reference point in a center of said 2D and 3D graphic displays is chosen from a set comprised of: (i) position of said first AV, (ii) position of a radar system functioning as a data source, and (iii) position selected by a user;
   wherein, with said first AV chosen as fixed reference point in a center of said 2D graphic display, a changing position of said first AV is shown by a changing position of said georeferenced 2D background map in nadir view;
   wherein, with said first AV chosen as fixed reference point in said 3D graphic display, a changing position of an AV is shown by a changing position of said georeferenced 3D map.

15. The system of claim 14, wherein said computer is further programmed:
   to determine whether position and velocity data for an AV obtained from a non-GCS data source duplicates UAV position and velocity data obtained from a GCS;
   wherein position vectors, r(t;u=1) and r(t;u=2), representing position vectors for said first AV and said second AV, respectively, satisfy two conditions: (i) for a small selected distance $\partial$, $|r(t;u=1)-r(t;u=2)| \leq \partial$ and (ii) for any time t1 and any non-zero time increment $\Delta t$, $r(t1+\Delta t;u=1)-r(t1; u=1)$ and $r(t1+\Delta t;u=2)-r(t1;u=2)$ are approximately parallel; and
   when conditions (i) and (ii) are both satisfied, removing an icon representing at least one redundant vector r(t1; u=1) and r(t;u=2) from closest approach computations and from said 2D and 3D graphic displays.

16. The system of claim 14, wherein said computer is further programmed:
   to estimate position coordinates for said first AV for at least one of two spaced apart other observation times, t=t'0 and t=t"0, that differ from t=t0;
   using the estimated position coordinates for said time t=t0 and for the at least one other observation time to estimate a velocity vector v(1) having velocity coordinates ($v_x$, $v_y$, $v_z$) for said first AV at said time t=t0;
   estimating position coordinates (x',y',z') at said time t=t0 for said second AV that is spaced apart from said first AV;
   providing a separation vector $\Delta r(1;2)$ connecting position vectors having coordinates (x,y,z) and (x',y',z') at said time t=t0;
   providing a separation plane, defined by the vectors v(2) and $\Delta r(1;2)$, corresponding to said time t=t0; and
   displaying the vectors v(2) and $\Delta r(1;2)$ and a position r1 in the separation plane corresponding to said time t=t0 in at least one of said 2D and 3D graphic displays.

* * * * *